(12) United States Patent
Muir et al.

(10) Patent No.: US 10,317,774 B2
(45) Date of Patent: Jun. 11, 2019

(54) ALL OPTICAL SAMPLING BY SLANTED LIGHT INTERROGATION FOR CROSS-CORRELATED ENCODED RECORDING (SLICER)

(71) Applicant: Lawrence Livermore National Security, LLC, Livermore, CA (US)

(72) Inventors: Ryan D Muir, Livermore, CA (US); John E Heebner, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 129 days.

(21) Appl. No.: 15/593,256

(22) Filed: May 11, 2017

(65) Prior Publication Data

US 2018/0329272 A1    Nov. 15, 2018

(51) Int. Cl.
*G02F 1/35* (2006.01)
*G02F 1/355* (2006.01)

(52) U.S. Cl.
CPC .......... *G02F 1/3517* (2013.01); *G02F 1/3556* (2013.01); *G02F 2201/20* (2013.01); *G02F 2203/07* (2013.01)

(58) Field of Classification Search
CPC .. G02F 1/3517; G02F 1/3556; G02F 2201/20; G02F 2203/07
See application file for complete search history.

(56) References Cited

U.S. PATENT DOCUMENTS

| 7,821,633 | B2 | 10/2010 | Jalali et al. | |
| 8,934,058 | B2 | 1/2015 | Chou et al. | |
| 9,225,418 | B2 | 12/2015 | Jolly et al. | |
| 9,476,768 | B2 | 10/2016 | DeFlores et al. | |
| 2009/0161092 | A1* | 6/2009 | Zanni .......... | G01J 3/10 356/51 |
| 2015/0249505 | A1 | 9/2015 | Provost et al. | |

OTHER PUBLICATIONS

Bennett et al., "Carrier-Induced Change in Refractive Index of InP, GaAs, and InGaAsP," IEEE J. of Quantum Electron., vol. 26, No. 1, 1990, pp. 113-122.

Bennett et al., "Upconversion Time Microscope Demonstrating 103X Magnification of Femtosecond Waveforms," Optics Letters, vol. 24, No. 11, 1999, pp. 783-785.

(Continued)

*Primary Examiner* — Tony Ko
(74) *Attorney, Agent, or Firm* — John P. Wooldridge

(57) ABSTRACT

Single-shot transient optical signals are recorded in a time regime of picoseconds to nanosecond. An auxiliary pump beam is crossed through the signal to sample a diagonal 'slice' of space-time, analogous to a rolling shutter. The slice is then imaged onto an ordinary camera, where the recorded spatial trace is a direct representation of the time content of the signal. The pump samples the signal by optically exciting carriers that modify the refractive index in a conventional semiconductor wafer. Through use of birefringent retarders surrounding the wafer, the integrating response of the rapidly excited but persistent carriers is differentiated by probing with two polarization-encoded time-staggered signal replicas that are recombined to interfere destructively.

37 Claims, 13 Drawing Sheets

(56) References Cited

OTHER PUBLICATIONS

Bowlan, "Complete Single-Shot Measurement of Arbitrary Nanosecond Laser Pulses in Time," Optics Express, vol. 19, No. 2, 2011, pp. 1367-1377.

Bowlan, "Crossed-Beam Spectral Interferometry: A Simple, High-Spectral-Resolution Method for Completely Characterizing Complex Ultrashort Pulses in Real Time," Optics Express, vol. 14, No. 24, 2006, pp. 11892-11900.

Bowlan et al., "Single-Shot Frequency-Resolved-Optical-Gating Device for Completely Measuring Nanosecond Laser Pulses in Time," OSA, 2010, 2 pp.

Coppinger et al., "Photonic Time Stretch and its Application to Analog-to-Digital Conversion," IEEE Trans. on Microwave Theory and Tech., vol. 47, No. 7, 1999, pp. 1309-1314.

Dorrer et al., "High-Dynamic-Range Single-Shot Cross-Correlator Based on an Optical Pulse Replicator," Optics Express, vol. 16, No. 18, 2008, pp. 13534-13544.

Dorrer et al., "Single-Shot High-Reslution Characterization of Optical Pulses by Spectral Phase Diversity," Optics Express, vol. 23, No. 26, 2015, pp. 33116-33129.

Dorrer et al., "Single-Shot Real-Time Characterization of Chirped-Pulse Amplification Systems by Spectral Phase Interferometry for Direct Electric-Field Reconstruction," Optics Letters, vol. 24, No. 22, 1999, pp. 1644-1646.

Fontaine, et al., "One Million Time-Bandwidth Product Full-Field Waveform Measurement Using Frequency-to-Time Interferometry," OSA/CLEO, 2011, 2 pp.

Han et al., Photonic Time-Stretched Analog-to-Digital Converter: Fundamental Concepts and Practical Considerations., J. of Lighwave Tech., vol. 21, No. 12, 2003, pp. 3085-3103.

Hernandez et al., "104 MHz Rate Single-Shot Recording with Subpicosecond Resolution Using Temporal Imaging," Optics Express, vol. 21, No. 1, 2013, pp. 196-203.

Jovanovic et al., "High-Dynamic-Range, 200-ps Window, Single-Shot Cross-Correlator for Ultrahigh Intensity Laser Characterization," Optical Society of America, 2007, 2 pp.

Nakamura et al., "Ultrafast (200-fs Switching, 1.5-Tb/s Demultiplexing) and High-Repetition (10 GHz) Operations of a Polarization-Discriminating Symmetric Mach-Zehnder All-Optical Switch," IEEE Photon. Technol. Lett., vol. 10, No. 11, 1998, pp. 1575-1577.

Nuss et al., "Time-to-Space Mapping of Femtosecond Pulses," Optics Lett., vol. 19, No. 9, 1994, pp. 664-666.

Okawachi et al., "Asynchronous Single-Shot Characterization of High-Repetition-Rate Ultrafast Waveforms Using a Time-Lens-Based Temporal Magnifier," Optics Lett., Vo. 37, No. 23, 2012, 4892-4894.

Raghuramaiah et al., "Simultaneous Measurement of Pulse-Front Tilt and Pulse Duration of a Femtosecond Laser Beam," Opt. Commun., 223, 2003, pp. 163-168.

Sarantos et al, "Solid-State Ultrafast All-Optical Streak Camera Enabling High-Dynamic-Range Picosecond Recording," Opt. Lett., vol. 35, No. 9, 2010, pp. 1389-1391.

Shih et al., "Chipscale, Single-Shot Gated Ultrafast Optical Recorder," Optics Express, vol. 20, No. 1, 2012, pp. 414-425.

Tajima, "All-Optical Switch with Switch-Off Time Unrestricted by Carrier Lifetime," Jpn. J. Appl. Phys., vol. 32, Part 2, No. 12A, 1993, pp. L1746-L1749.

Tang et al., "Analysis of the Characteristics of TOAD's Subject to Frequency-Detuned Control and Signal Picosecond Pulses," IEEE J. of Quntum Elec., vol. 35, No. 11, 1999, pp. 1704-1712.

Toliver et al., "Comparison of Three Nonlinear Interferometric Optical Switch Geometries," Elsevier, Optics Comm., 175, 2000, pp. 365-373.

Trebino, "The Measurement of Ultrashort Laser Pulses," (Kluwer Academic, 2002), pp. 11.1 and 6.2-6.88.

Walden, "Analog-to-Digital Converter Survey and Analysis," IEEE J. on Selected Areas in Comm., vol. 17, No. 4, 1999, pp. 539-550.

Walmsley et al., "Characterization of Ultrashort Electromagnetic Pulses," Advances in Optics and Photonics 1, 2009, 308-437.

Wang et al., "Single-Shot Measurement of >10(superscript10) Pulse Contrast for Ultra-High Peak-Power Lasers," Scientific Reports, DOI: 10.1038; 2014, pp. 1-5.

Wong et al., "Single-Frame Measurement of Complex Laser Pulses Tens of Picoseconds Long Using Pulse-Front Tilt in Cross-Correlation Frequency-Resolved Optical Gating," J. Opt. Soc. Am. B, vol. 30, No. 11, 2013, pp. 2781-2786.

Wyatt et al., "Versatile Single-Shot Background-Free Pulse Duration Measurement Technique, for Pulses of Subnanosecond to Picosecond Duration," Appl. Phys., 25, 1981, pp. 297-301.

International Search Report and Written Opinion for PCT/US2018/031646 corresponding to U.S. Appl. No. 15/593,256, 7 pages.

\* cited by examiner

| Instrument | Method | Temporal Range$_{10^x s}$ | Advantages | Limitations | Spectral coverage | Availability |
|---|---|---|---|---|---|---|
| SLICER | Semi-conductor | | Resolution, record, simplicity | Efficency? | 500nm ~2μm* Many options | Focus of this patent |

FIG. 1B

ALL OPTICAL SAMPLING BY SLANTED LIGHT INTERROGATION FOR CROSS-CORRELATED ENCODED RECORDING (SLICER)

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to techniques for recording transient optical signals, and more specifically, it relates to single-shot recording technology for transient optical signals in a time regime of picoseconds to nanoseconds.

Description of Related Art

Multiple single shot recording techniques have been demonstrated, including Time lens, Frequency Resolved Optical Gating (FROG), spectral interferometry, temporal holography, Time Stretch, Spectral Phase Interferometry for Direct Electric Field Reconstruction (SPIDER), phase diversity, and others. Cross-correlators have appeal because they directly sample the intensity of a signal, require minimal post-processing, and can be displayed in real time. Many single-shot cross-correlators have been demonstrated based on crossing pump-probe geometries enabling an ordinary camera to record spatially the time content of a signal. Second-order, $\chi^{(2)}$ nonlinearities are typically employed to enable a short pulse (pump) to sample a signal (probe) via Sum Frequency Generation (SFG). Because of their ultrafast response, these sampling mechanisms are optimal for achieving time resolution limited primarily by the pump pulse duration. However, because time-of-flight at the speed of light dictates the mapping of time to space, extending these techniques to long record lengths has proven to be challenging. The primary challenges result from the limited apertures of commercially available $\chi^{(2)}$ crystals, stringent phase matching requirements, demanding spectral and angular requirements for the pump beam, and complexities associated with employing pulse front tilt or etalon replicators.

It is thus desirable to identify a sampling mechanism that can overcome these challenges. Optical sampling based on the $\chi^{(3)}$ intensity-dependent refractive index (Kerr effect) has been implemented in many ultrafast interferometric switches, but due to the weak strength of the effect, it demands impractically high peak intensities or long interaction lengths. In contrast, semiconductor nonlinearities resulting from optically-excited carrier-based changes to the refractive index can be a million times stronger. Unfortunately, while the carriers can be rapidly excited to the conduction band at sub-picosecond timescales, their usefulness in short pulse applications is typically limited by their long persistence resulting from recombination times lasting several nanoseconds. In the same spirit of TOAD switch, SMZI switch, SLIDER chipscale deflector, and SCALPEL chipscale interferometer techniques, it is desirable to develop a novel technique that enables access to the strong index changes in semiconductors while achieving sub-picosecond resolution by mitigating their integrating response.

SUMMARY OF THE INVENTION

An embodiment of the invention provides a novel single-shot recording technology for transient optical signals in a time regime of picoseconds to nanoseconds for which currently there is a significant instrumentation gap. Much like other single-shot recording techniques, an auxiliary pump beam is crossed through the signal to sample a diagonal 'slice' of space-time, analogous to a rolling shutter. The slice is then imaged onto an ordinary camera, where the recorded spatial trace is a direct representation of the time content of the signal. In contrast to related techniques, in the present invention, the pump samples the signal by optically exciting carriers that modify the refractive index in a conventional semiconductor. Through use of birefringent retarders surrounding the semiconductor, the integrating response of the rapidly excited but persistent carriers is differentiated by probing with two polarization-encoded time-staggered signal replicas that are recombined to interfere destructively. This mechanism has several advantages including the use of readily available, inexpensive, semiconductor wafers, relaxed requirements on the pump, no need for phase matching, and scalability to long record lengths.

FIG. 1A shows a survey of prior art single shot instrumentation with ps-to-ns timescales. No instrument has been previously demonstrated that can achieve a ns of record with ps resolution. FIG. 1B shows the present invention (sometimes referred to herein as SLICER) has the potential to scale to this resolution and record. Moreover, it can do this across broad spectral operation, depending on the semiconductor material.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 1B shows the present invention has the potential to scale ps-to-ns timescales.

DETAILED DESCRIPTION OF THE INVENTION

The optical switching capability of semiconductors can be exploited in a pump-probe style architecture, where a pump beam changes the refractive index in the semiconductor to rapidly modify the phase of the probe beam. The relatively long excited state lifetime of semiconductors modifies the probe beam for a nanosecond or more, which is a long and integrating response for measurements at picosecond timescales. Therefore, taking the derivative of the pumped response after traversing the semiconductor enables a short sampling response.

Derivatives can be taken optically in a technique analogous to numerical derivatives, in which the derivative of a function is numerically calculated by subtracting from the function a shifted copy of itself. Analogously, a derivative of the phase response experienced by an electric field with respect to time can be taken optically by subtracting from the field (destructively interfering) a delayed copy of itself. In the case of SLICER, it is specifically the derivative of the probe beam's induced temporal phase changes ($d\phi/dt$) that cancels the long absolute phase shift. The derivative $d\phi/dt$ can be performed optically by subtracting from the field a copy of itself in which the induced phase changes have been delayed. To accomplish this, a delayed copy of the probe beam is created in a collinear fashion, the pump beam imposes a phase change on both copies simultaneously as it traverses the semiconductor, the delay is then removed from the probe beam's copy, and the probe beam is subtracted from its copy by destructive interference. The resulting electric field at the output is the signal input envelope multiplied (sampled) proportional to the square of the temporal derivative of the induced phase change.

Figure 1A:
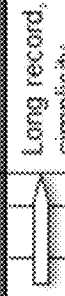
FIG. 1A shows a survey of prior art single shot instrumentation with ps-to-ns timescales.
Figure 2A:
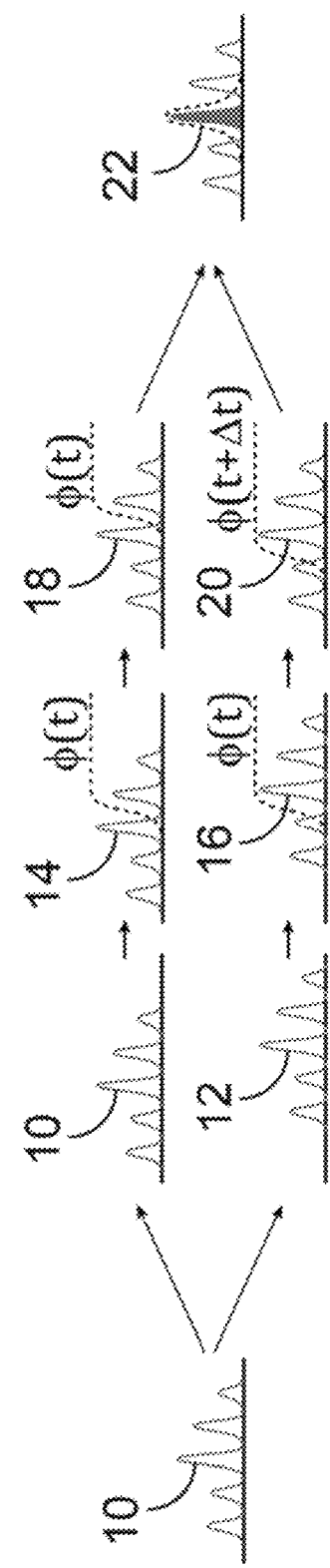
FIG. 2A illustrates the steps general to all embodiments of the invention for producing an all-optical derivative of induced phase change, $\phi(t)$, with respect to time, $d\phi(t)/dt$.

FIG. 2A illustrates steps of an embodiment of the invention for producing an all-optical derivative of induced phase change, $\phi(t)$, with respect to time, $d\phi/dt$. Note that the comb of 5 pulses is representative of a typical input signal. Input signal 10 is copied to produce delayed input signal 12 having delay $\Delta t_{stagger}$. A phase change $\phi(t)$ is imposed simultaneously on both input signal 10 and delayed input signal 12 to produce signal 14 and signal 16, respectively. Re-stacking and subtracting the respective pair, now shown as signal 18 and signal 20, respectively, completes the derivative. For a phase change induced by a Gaussian pump pulse, the resulting integrated phase change with respect to time differentiates back into a Gaussian shaped output 22. This opens a brief Gaussian sampling window that isolates a sample of the signal at one portion in time for recording on one portion in space on the camera.

Derivation of Predicted Performance

There are many mechanisms in semiconductors that result in an index change from optically excited carriers, including band filling, bandgap shrinkage, Drude plasma refraction, and the Kerr effect. While all of these mechanisms contribute to the final induced phase, we restrict our attention in this theoretical treatment to the Drude plasma refraction effect due to its simplicity and universality.

Optically pumping a semiconductor generates carriers, which induce a local change in the refractive index. The refractive index change, $\Delta n$, is a function of time and depth. These dependencies are separable into a time-dependent component and a depth-dependent component. The time-dependent component, $\Delta n(t)$ at the z=0 surface, is driven by the pump intensity. The depth-dependent component is governed by the Beer-Lambert decay law with absorption constant $\alpha_p$. The phase induced on a probe signal at wavelength $\lambda_s$ is proportional to the refractive index distribution integrated over its decay in z:

$$\phi(t) = \frac{2\pi}{\lambda_s}\Delta n(t)\int_0^\infty e^{-\alpha_p z}dz = \frac{2\pi}{\alpha_p \lambda_s}\Delta n(t) \tag{1}$$

In the Drude model, $\Delta n$ is linearly proportional to the change in carrier density, $\Delta N$, by a constant, $dn/dN$:

$$\Delta n(t) = \frac{dn}{dN}\Delta N(t) \tag{2}$$

The local density of carriers generated by optically pumping the semiconductor is proportional to the number of photons absorbed per unit volume:

$$\Delta N(t) = \frac{\alpha_p \lambda_p}{hc}\int_{-\infty}^t I_p(t)dt \tag{3}$$

where $\lambda_p$ is the pump wavelength, and the pump fluence is explicitly described as the time-integrated pump intensity, $I_p$. Equations 1 through 3 can be combined into an equation for the integrating phase shift:

$$\phi(t) = \frac{2\pi}{\lambda_s}\frac{dn}{dN}\frac{\lambda_p}{hc}\int_{-\infty}^t I_p(t)dt \underset{t\to\infty}{\longrightarrow} \phi_{max} \tag{4}$$

where we denote $\phi_{max}$ as the asymptotic limit or maximum integrated phase that is proportional to the pump fluence. Note that in the Drude approximation, due to the linear relationship between index change and carrier density, this phase is independent of the absorption coefficient, $\alpha_p$.

Figure 2C:
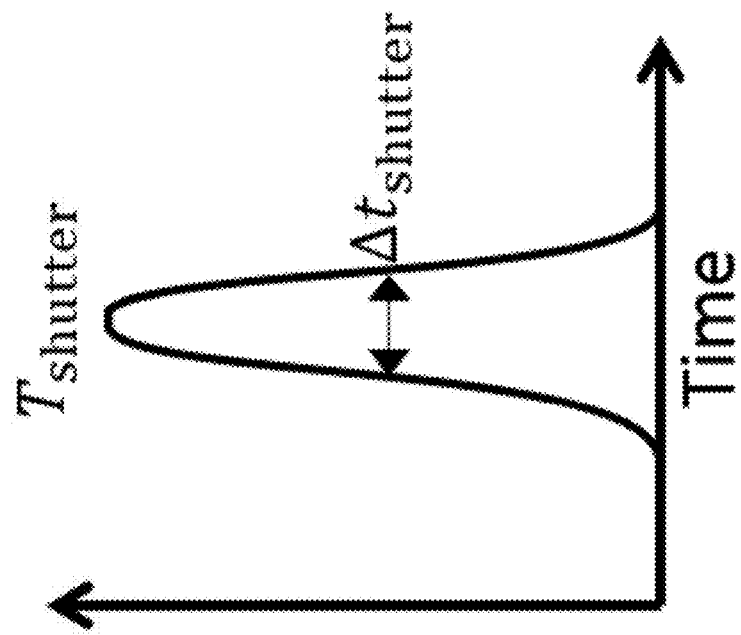
FIG. 2C is an illustration of the parameters describing the SLICER shutter response, $T_{shutter}$ and $\Delta t_{shutter}$.
Figure 2B:
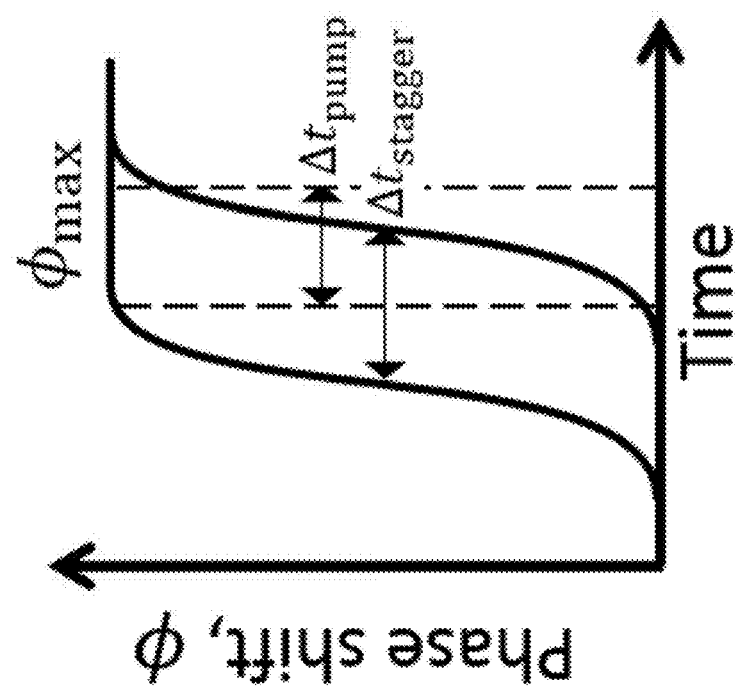
FIG. 2B is an illustration of the semiconductor phase response parameters $\phi(t)$, $\phi_{max}$, $\Delta t_{stagger}$, and $\Delta t_{pump}$.

To achieve a short time gating function, we probe the pumped region with two staggered copies of the signal to effectively differentiate the integrating phase response. The copies probe the pumped region of the semiconductor, and incur equivalent integrated phase changes, albeit with a staggered time shift $\Delta t_{stagger}$. After traversing the semiconductor, the copies are again overlapped in time, and destructively interfered. Thus, for early and late times, the destructive interference leads to zero light transmission. However, while the pump pulse is altering the refractive index, one copy acquires a phase shift prior to the other copy. This leads to a transient differential phase shift that opens a brief sampling window for the signal as illustrated in FIG. 2B. For a Gaussian pump pulse of FWHM duration $\Delta t_{pump}$, the maximum differential phase shift is:

$$\Delta\phi_{max} = ERF\left[\frac{\sqrt{\ln 2}\,\Delta t_{stagger}}{\Delta t_{pump}}\right]\phi_{max} = \eta\phi_{max} \qquad (5)$$

where the differential phase efficiency, η, represents the Gaussian error function that dictates how closely the maximum differential phase shift approaches the maximum integrated phase shift. The shutter response resulting from the brief differential phase can be characterized by a maximum transmission $T_{shutter}$ (FIG. 2C) and a full width half maximum (FWHM) temporal width $\Delta t_{shutter}$ (FIG. 2C). These functions are respectively given as:

$$T_{shutter} = \sin\left(\frac{\Delta\phi_{max}}{2}\right)^2 \approx \frac{1}{4}\eta^2 \Delta\phi_{max}^2 \qquad (6)$$

$$\Delta t_{shutter} \approx \sqrt{\frac{4\ln 2}{\pi}}\, \frac{\Delta t_{stagger}}{ERF\left[\sqrt{2}\,\frac{\sqrt{\ln 2}\,\Delta t_{stagger}}{\Delta t_{pump}}\right]} \qquad (7)$$

Note that the stagger time can be chosen to tradeoff shutter transmission and resolution. Specifically, the transmission is improved with increasing stagger time, though with diminishing returns after exceeding the pump pulse duration. The shutter width can be reduced to $1/\sqrt{2}$ of the pump pulse width in the limit of small stagger times. The energy requirement can be estimated by setting the integrated phase shift to π radians.

$$E_p = \frac{hc^2 \lambda_s}{2\lambda_p} \frac{D_y}{\frac{dn}{dN}} \Delta t_{record} \qquad (8)$$

where $D_y$ is the pump stripe height and $\Delta t_{second} \approx D_x/c$ is the record length for a pump beam at grazing incidence.

Reduction to Practice

Figure 3A:
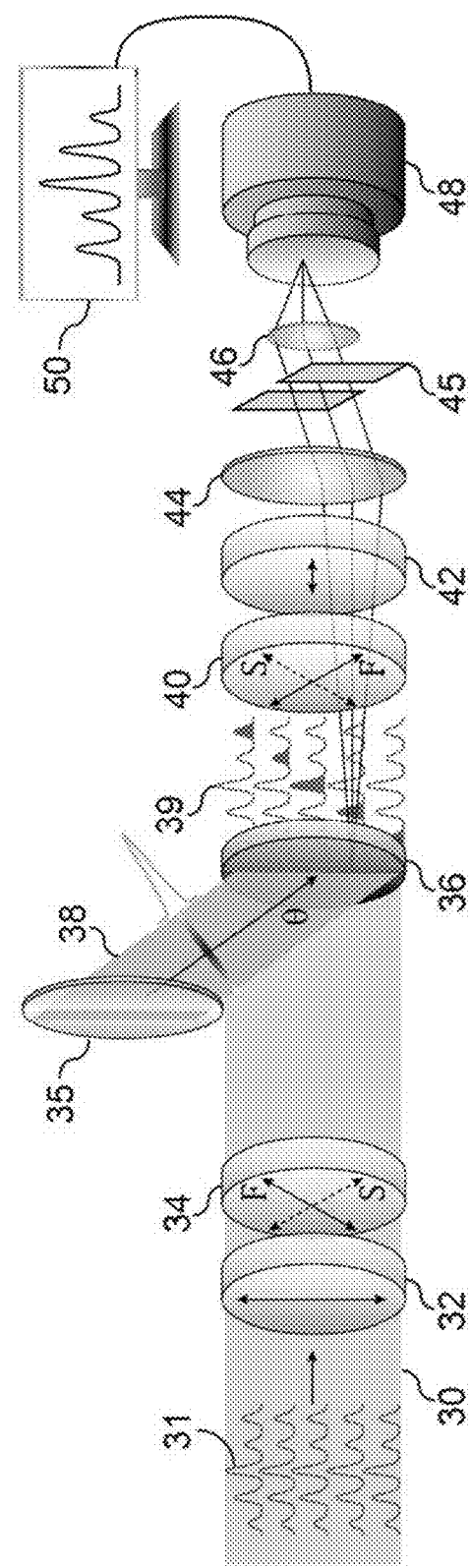
FIG. 3A is a schematic of the setup of an embodiment providing slanted light illumination for cross-correlated encoder readout (SLICER).

An embodiment of the SLICER setup is shown in FIG. 3A. An input optical signal 30 having, e.g., amplitude profile 31 to be recorded is provided. Signal 30 is linearly polarized with polarizer 32. The polarized input is sent through a thick birefringent retarder waveplate 34, which creates a pair of orthogonally polarized signal replicas delayed in time (e.g., by 300 fs for 10 mm quartz) as a result of the fast and slow axes of the retarder waveplate 34. These beams are collimated at normal incidence through a semiconductor wafer 36. To achieve high carrier density, a femtosecond to picosecond pump beam 38 of order microJoule energy is focused, using a tilted cylindrical lens, to a stripe on the semiconductor wafer's (GaAs, Si, etc. . . . ) surface. Overlapping the beams onto the semiconductor surface creates a spatially dependent phase mapping of arrival times of the pump vs. signal beams 39, with steeper angles creating a larger range of arrival times across the wafer surface. For pump photon energies above the bandgap, the ultrafast pump excites carriers in the semiconductor, which alters the material refractive index experienced by the signal in the excited region. A thick birefringent retarder waveplate 40 re-stacks the pulse pair in time. Within the time gate of the pump arrival, the relative phase is modified, and results in a differential phase within that time gate when the signal is re-stacked. A polarizer 42 completes the derivative by selecting the differentially phased time gate and rejecting the signal at all other times. The polarizer 42 is oriented to transmit light orthogonal to that transmitted by polarizer 32. The rolling shutter encodes the temporal signal across space, and is imaged with imaging optics 44, 46, onto a camera 48 where it is captured as a spatial trace 50. In summary, FIG. 3A is a schematic of the SLICER setup. Two staggered copies of an input signal to be measured are created along orthogonal fast (F) and slow (S) eigenaxes of the first birefringent retarder. While traversing the semiconductor, a pump pulse imparts a sustained phase shift on both signal copies. A second birefringent retarder overlaps the copies and a crossed polarizer is adjusted to achieve destructive interference between them. During the staggered time window while the pump pulse arrives, a differential phase shift is achieved which briefly opens up a sampling window for the signal at one point in time.

To demonstrate the record length and uniformity of SLICER, a single impulse was scanned using a delay stage across the record in 1.2 ps steps across a useable record length of 54 ps. Each step was averaged across 50 measurements to reduce shot-to-shot laser fluctuation noise. SLICER achieved a uniform response across its record after calibration with a previous dataset. The time-to-space mapping was found to be highly linear. The camera trace is effectively mapped to 0.25 ps per pixel corresponding to a sampling rate of 4 TS/s for the recording system.

Figure 4:
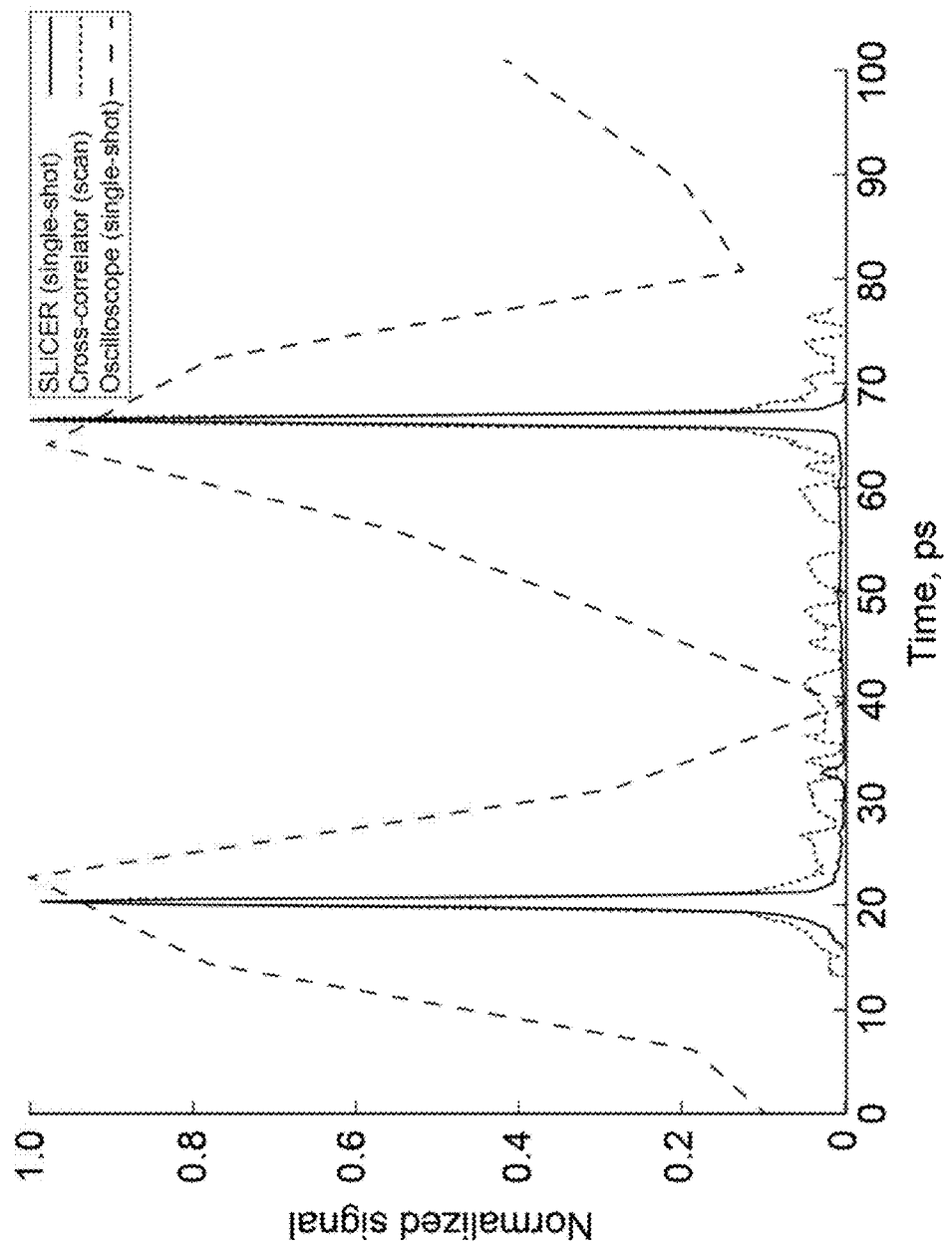
FIG. 4 shows data from an experimental reduction to practice comparing recording a double-pulse test signal with SLICER against two other conventional optical measurements.

A single shot capture was demonstrated in FIG. 4 with a test pattern of a double pulse separated by 46 ps created by a Michelson interferometer. For comparison, two other conventional diagnostics were used to measure the test pattern, and are overlaid. SLICER traces are shown in solid line, a scanning cross correlator is shown in dotted line, and a fast photodiode and 45 GHz oscilloscope is shown in dashed line. Note that the scanning cross correlator measurement took 15 minutes to complete its multi-shot scanning measurement. The small pulse located ~12 ps from every main pulse in FIG. 4 is due to a double bounce reflection in the semiconductor wafer, and could be mitigated with an anti-reflection coated wafer.

Table 1 compares the results of the 3 overlaid traces. For SLICER and the scanning cross-correlator, $\Delta t_{meas}$ is the result of a convolution between the probe and shutter functions, giving:

$$\Delta t_{meas} = \sqrt{\Delta t_{signal}^2 + \Delta t_{shutter}^2} \qquad (9)$$

where $\Delta t_{shutter}$ is the pump pulse width for the cross-correlator. Since the pump pulse in the cross-correlation was a pulse of identical wavelength and pulsewidth as the signal, the inferred signal pulsewidth and sampling resolution are identical. For the SLICER technique, $\Delta t_{signal}$ and $\Delta t_{shutter}$ were solved using equations 7 and 9 where the pump pulsewidth was $\Delta t_{pump} = t_{signal}/\sqrt{2}$ because of the harmonic doubling. For the SLICER measurement, the effective shutter resolution benefited both from harmonic doubling to create the pump, as well as the shutter response.

TABLE 1

|  | Measured FWHM (SLICER) $\Delta t_{meas}$ | Inferred signal pulsewidth (SLICER) $\Delta t_{signal}$ | Inferred resolution (SLICER) $\Delta t_{shutter}$ | Measured FWHM (X-Corr) $\Delta t_{meas}$ | Inferred signal pulsewidth (X-Corr) $\Delta t_{signal}$ | Inferred resolution (X-Corr) $\Delta t_{shutter}$ | Measured FWHM (oscilloscope) $\Delta t_{meas}$ |
|---|---|---|---|---|---|---|---|
| Pulse 1 | 0.90 | 0.78 | 0.45 | 0.99 | 0.70 | 0.70 | 18 |
| Pulse 2 | 0.86 | 0.75 | 0.43 | 1.09 | 0.77 | 0.77 | 22 |

The record length can be increased by scaling the size of all the optics. Pumping a 300 mm wafer 36 at grazing incidence would create a 1 ns record. Silicon wafers can be commercially purchased with sizes up to 450 mm for records in excess of 1 nanosecond. A telescope can be placed after lens 35 to scale the pump stripe as an alternative to using a large cylindrical lens 35. Imaging telescopes can be used before and after wafer 36 as an alternative to scaling elements 32, 34, 40, 42, and 44.

The record length can be alternatively or additionally increased by slanting the signal beam 30 in the opposite direction of the pump beam 38. For a signal beam at an opposing grazing incidence angle $-\theta$, the record doubles in length. Imaging device 48 would need to be angled in such a configuration to image wafer 36.

Figure 3B:
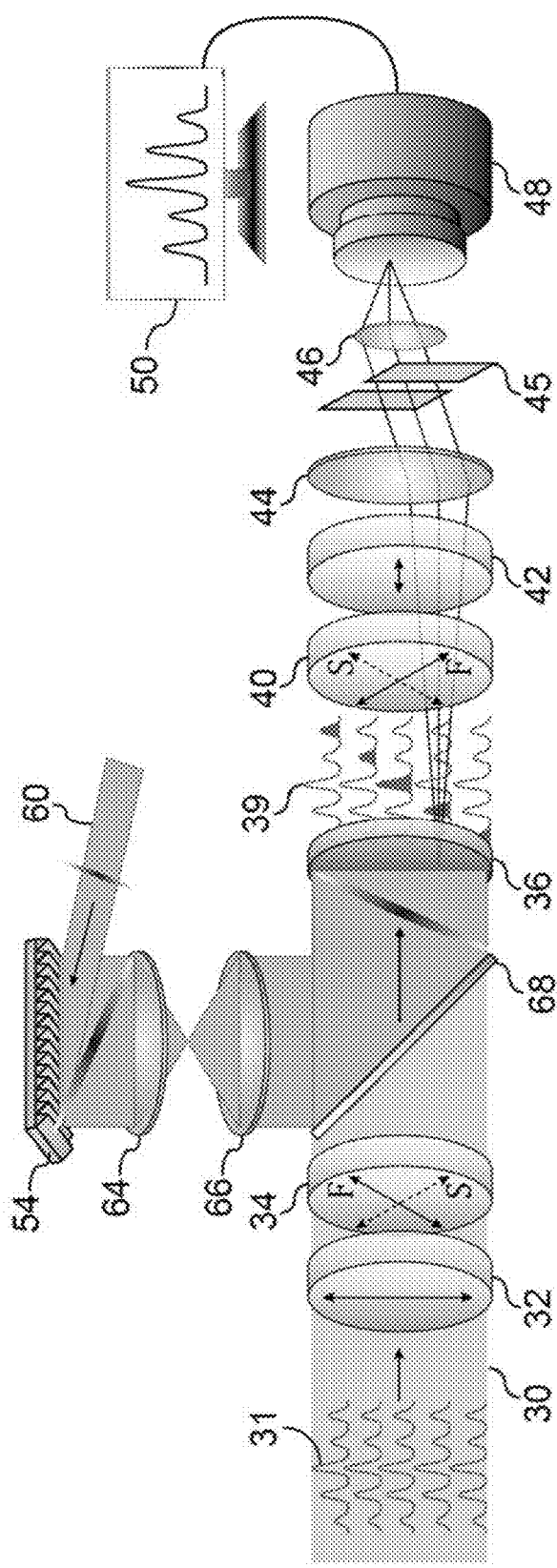
FIG. 3B demonstrates an embodiment of SLICER that leverages a grating to enhance the record span.
Figure 3C:
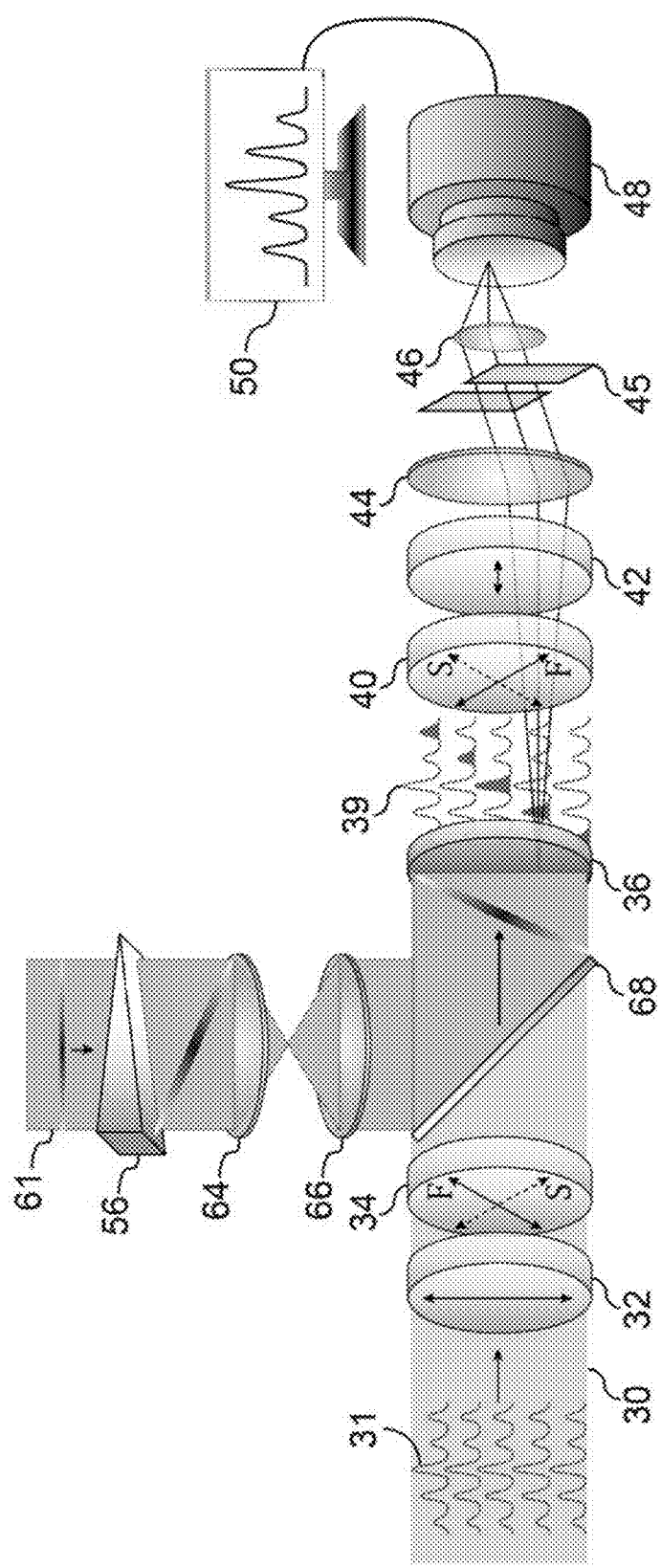
FIG. 3C demonstrates an embodiment of SLICER that leverages a prism to enhance the record span.
Figure 3D:
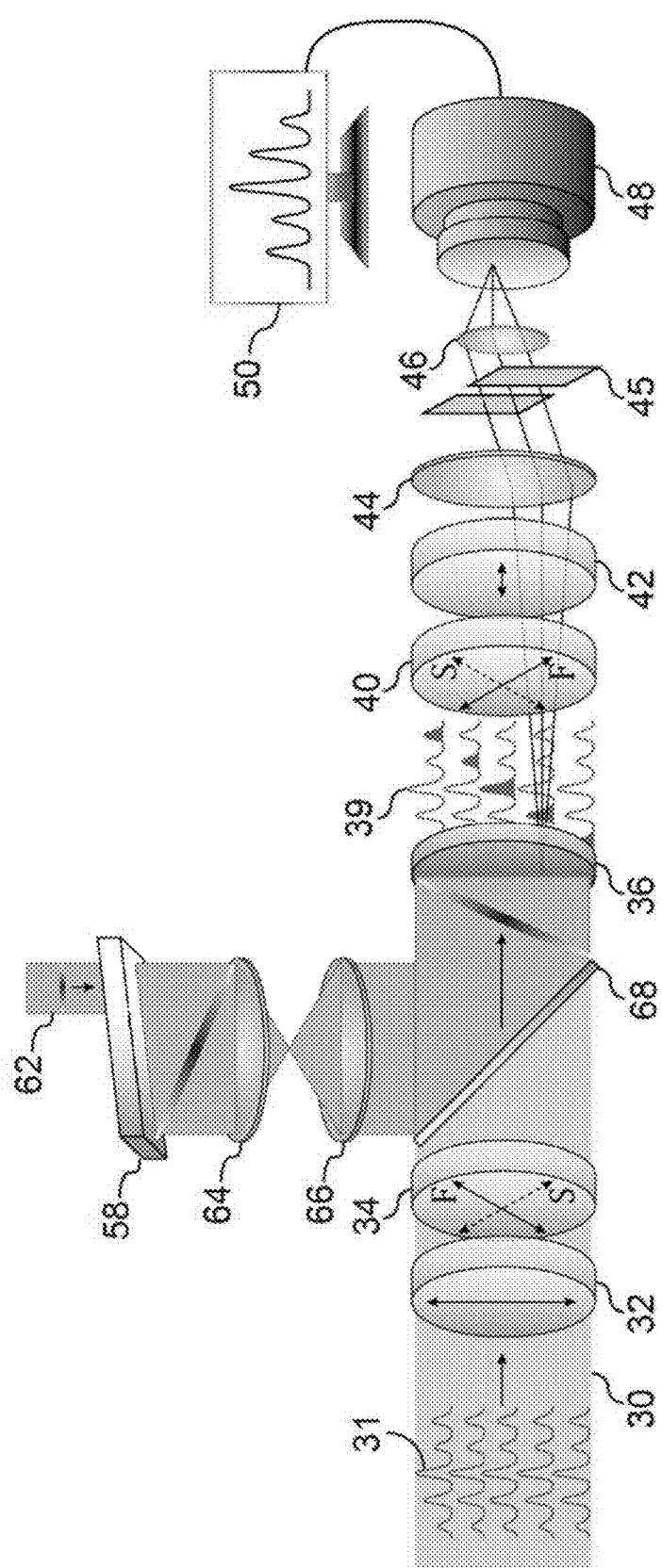
FIG. 3D demonstrates an embodiment of SLICER that leverages an etalon to enhance the record span.

As an alternative to slanted incidence, the record length can be increased by utilizing pulse front tilt with a grating, prism, or etalon on the pump or signal beams. FIGS. 3B, 3C and 3D show pump beam 60, 61 and 62 respectively. Imaging a grating 54, prism 56, or etalon 58 onto wafer 36 using lenses 64 and 66 as shown in FIG. 3B, FIG. 3C, and FIG. 3D, respectively, would create a pulse front tilt on the pump beam. In these configurations, the pump travels collinearly with the signal with the inclusion of a beamsplitter 68. Alternatively, or additionally, an etalon, prism, or grating could be put on the signal beam path before polarizer 32 with pulse front tilt angle opposing that of the pump beam to further increase the record length.

For a pump that takes advantage of bandfilling and saturable absorber effects, such as a pump that is near the band edge of a direct bandgap semiconductor, pumping with a long pulse laser may not disrupt the resolution. Since the pump effectively saturates the material to some maximum carrier concentration, it is the peak power that the pump delivers that is important, rather than the pump pulse duration. For a typical Q switch laser that delivers 1 MW pulses (1 uJ per every 1 ps time slot), this is well in excess of what is required to achieve a half wave of phase change for many semiconductors. Therefore, provided that a thin saturable absorber layer is deposited on substrate 36 that is transparent to the pump wavelength, a long Q switch laser pulse may be used while maintaining sub-ps resolution.

SUMMARY OF ADVANTAGES

The geometry of this device resembles a single shot nonlinear cross correlator; in both setups, a pump beam intersects with and samples a passing probe beam, and the slice that arises from this process is observed by a camera. However, there are several advantages of the SLICER setup. 1. There is no stringent angular sensitivity on the pump or signal, allowing for aggressive tilts to be used. By contrast, the nonlinear crystals used in $\chi^{(3)}$ single shot nonlinear cross correlators have stringent angle and phase matching requirements, usually necessitating that a pulse front tilt via a diffraction grating instead of a slanted incidence be employed. Aggressive pulse front tilt naturally results in higher chromatic angular dispersion, which limits the record length capabilities of single shot $\chi^{(2)}$ cross correlators. 2. As a direct result of the advantages in point 1, there is easier setup and alignment. 3. There are a wide variety of commercially available semiconductor optical materials compared to $\chi^{(2)}$ nonlinear optical crystals, each with different properties to best suit different combinations of available pump and signal wavelengths. While the nonlinear crystals used in nonlinear cross correlators are typically limited to measuring signals in the NIR/VIS regime, the extremely broad range of semiconductor materials allows for measurement of signals across virtually the entire electromagnetic spectrum for which standard optical elements are available, including but not limited to: Far-IR, Mid-IR, Near-IR, Visible, and UV. 4. The requirements of the pump beam's quality, wavefront, wavelength, polarization, and coherence are very relaxed. Provided that the pump's duration is finer than the required resolution and induces sufficient phase change for the gated signal to be detectable, the system will function as intended. 5. Semiconductor materials can typically be made much larger than $\chi^{(2)}$ nonlinear optical crystals, resulting in scalability to long records lengths.

Background Suppression and Signal Enhancement

The leakage of probe (signal) light through the polarizers outside of the sampling window can result in a substantial background on the camera. Suppressing this background is of increasing importance for long records. There are two major contributions to background signal. We refer to 'static background' as the imperfect cancellation of the two probe copies in the absence of a pump perturbation. High extinction ratio polarizers 32 and 42, as well as birefringent filters 34 and 40 of high uniformity, with precision tolerances on thickness and anti-reflective coatings can suppress most of the static background. We refer to 'dynamic background' as the imperfect cancellation of the two probe copies due to perturbation of the pump, outside of the sampling window (well after the pump arrival). The perturbation by the pump induces the desired differential phase shift, and an undesired persistent (integrated) phase shift on both copies. These can cause vertical (cylindrical) lensing, which deflects the probe beam in both directions orthogonal to the stripe's long (horizontal) axis. This may lead to imperfect cancellation of the signal beam as it passes through birefringent filter 40 at new angles, and is an origin of the dynamic background.

Additional background suppression can be achieved by placing vertically limiting spatial filters, stops, or apertures 45, in the Fourier plane of the wafer 36. A vertically offset horizontal slit can be employed as an aperture to preferentially transmit just one of the two deflected signal components. This has the effect of further minimizing the static background focused at the center of the Fourier plane, and the dynamic background that receives a stronger deflection. Temporal resolution is not compromised, since the horizontal slit (vertically limiting) does not limit the angular bandwidth in the horizontal axis. With the offset horizontal slit minimizing the transmitted angle range, the dynamic background can be further reduced by tilting birefringent filter 40 in compensation for the deflected signal component transmitted through the slit.

The signal can be enhanced by taking advantage of the pump-induced cylindrical lensing. The optimal imaging plane is shifted from the wafer by the focal length of this induced lens. At the focal plane of this lens, located immediately before or after wafer 36 (for a negative or positive change in refractive index, respectively), the signal focuses to a finer stripe. When imaging onto the camera 48, it is advantageous to focus all the pumped signal to a single row of pixels, which maximizes the ratio of signal to background. Therefore, the focal plane may be imaged to the camera instead of the wafer plane 36.

Semiconductors with crystal defects, such as low temperature grown GaAs or ion bombarded GaAs, can be used to further reduce background. Since the carriers can rapidly recombine in the defects within a picosecond, the lens induced by the pump may be erased before the background is substantially accumulated along the record.

Alternative Stagger Mechanisms

Maintaining collinear beam paths for the staggered probes is generally a good strategy for mitigating phase defects and mechanical vibrations in an interferometric process. The general device geometry as shown in FIG. 3A maintains a collinear beam path using a collinear interferometeric arrangement, where the fast and slow polarizations introduced by the birefringent filters 34 and 40 form the two arms of the interferometer. Other interferometer types, such as the traditional Mach-Zehnder or Michelson interferometers, would also function, though both arms would need to be pumped separately.

The Sagnac interferometer is another interferometer with collinear arms, albeit counterpropagating, that would function for this device. In the Sagnac geometry, $\Delta t_{stagger}$ is created by placing the semiconductor in the loop at an offset from the point of equal delay. The Sagnac geometry with a 50:50 beamsplitter coupler would represent a replacement of components 32, 34, 40, and 42 of FIG. 3A, with all other elements remaining the same; specifically, a pump stripe 38 of varying arrival times across the semiconductor surface 36 produces a stripe of record when imaged onto a camera 48 with imaging lenses 44 and 46. The Sagnac geometry is fully compatible with all of the modifications and extension of the general embodiment described in FIG. 3A.

Waveguide Embodiment

Figure 3E:
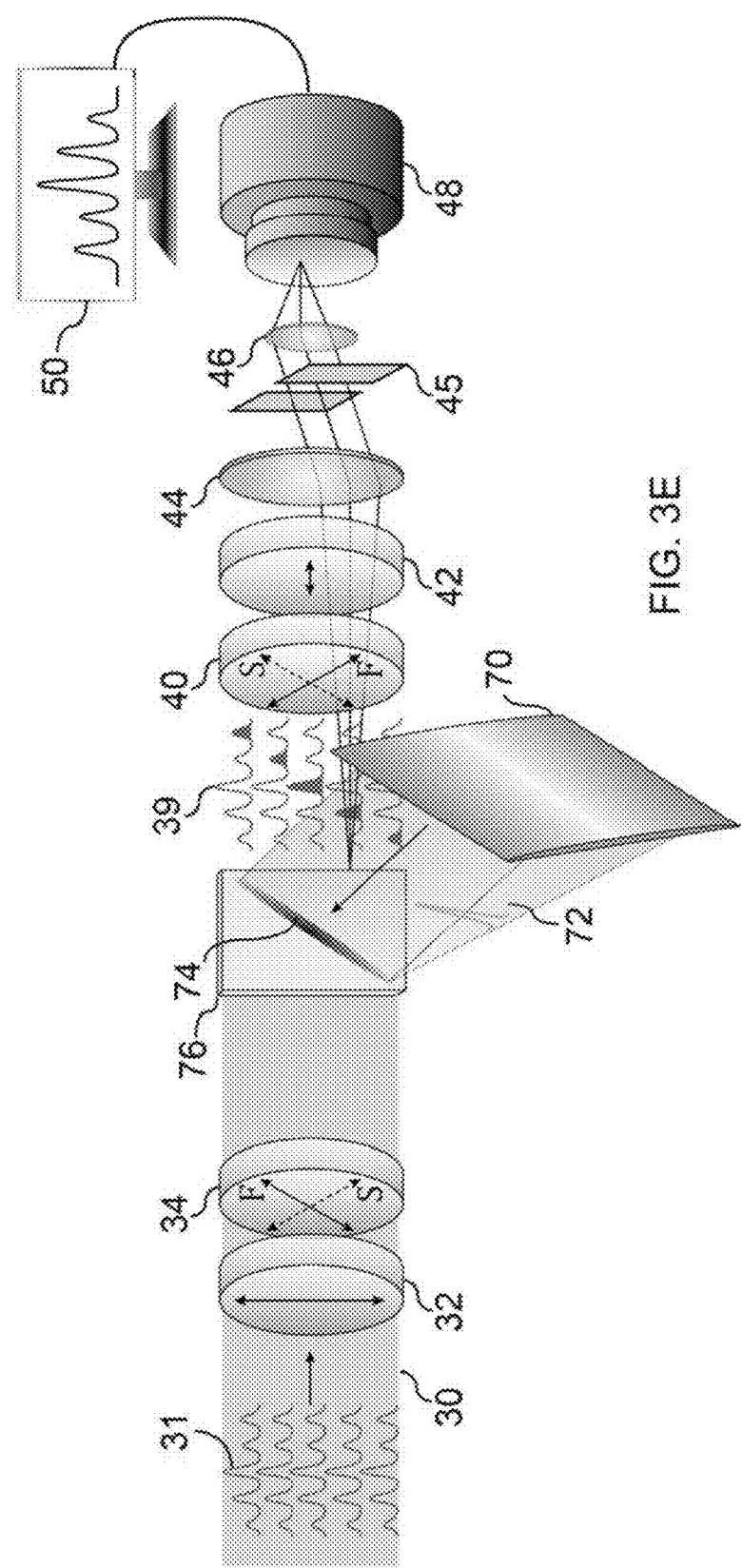
FIG. 3E demonstrates an embodiment of SLICER in a waveguide architecture where only the signal and its copy are coupled into the waveguide.

In contrast to the free space approach of the instrument in FIG. 3A, an alternate embodiment in FIG. 3E utilizes a waveguide approach. The waveguide can be grown through a variety of deposition processes, including molecular beam epitaxy (MBE) or metal-organic chemical vapor deposition (MOCVD) growth of semiconductor material onto a wafer substrate. After coupling the signal into the waveguide 76, pumping the surface of the slab waveguide with a diagonal stripe 74 as the signal 30 traverses the guide would induce a phase change across space-time 39, and extract identical information to the instrument of FIG. 3A. Pump beam 72 is directed through cylindrical lens 70 to produce diagonal stripe 74. Changing the orientation of the pump stripe changes the record span and resolution tradeoff. Etalons, prisms, as well as slanted incidence or gratings, may be used on the pump and/or probe to further increase the record span. This enables longer records for the amount of space used compared to the geometry of FIG. 3A, since light is slowed by a factor of 3~4 in most semiconductor materials.

Figure 3F:
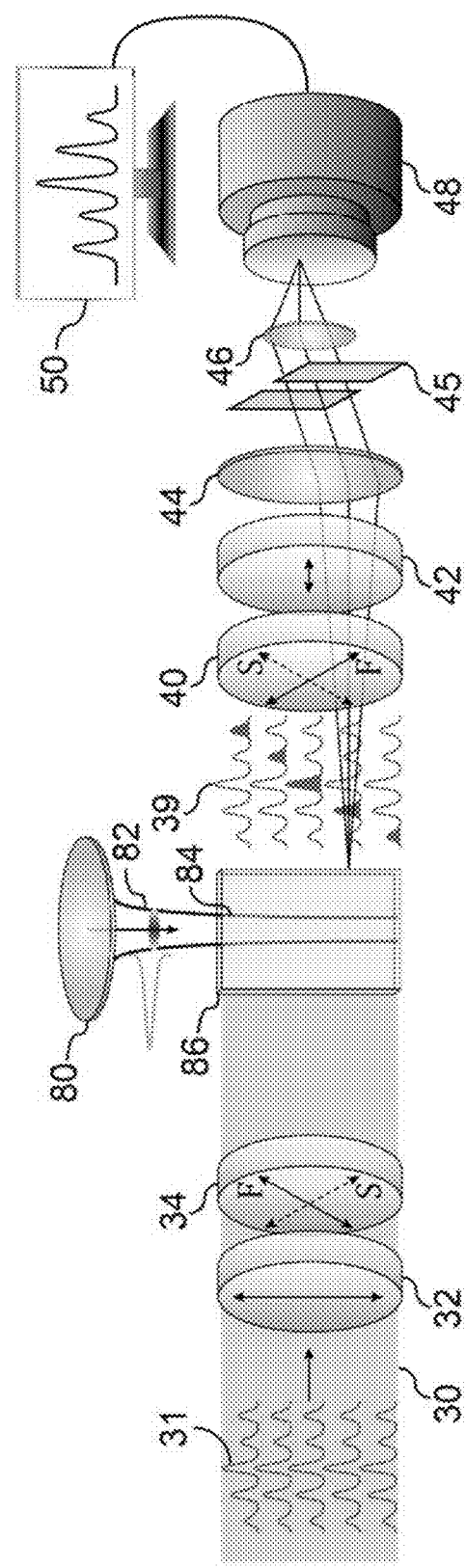
FIG. 3F demonstrates an embodiment of SLICER in a waveguide architecture where the pump, the signal, and its copy are coupled into the waveguide.
Figure 3G:
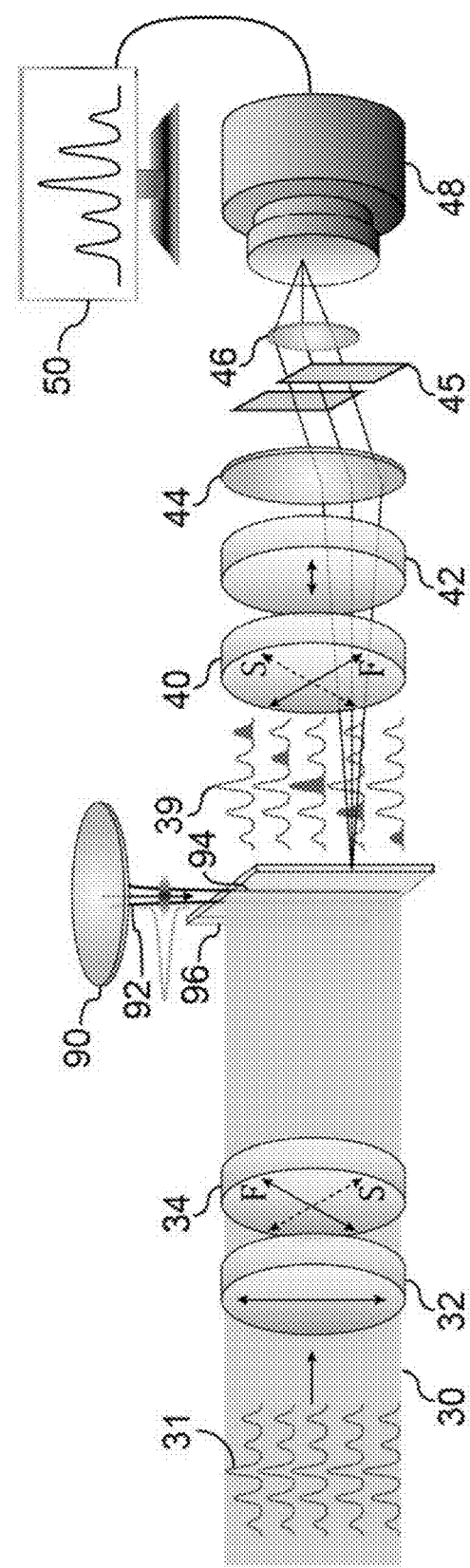
FIG. 3G demonstrates an embodiment of SLICER in a waveguide architecture where only the pump is coupled into the waveguide.

If the waveguide takes advantage of band filling and bandgap shifting effects to act as a saturable absorber, a pump with a wavelength above the band edge can be launched into the waveguide as illustrated in FIG. 3F and FIG. 3G. The band edge shifts past the absorption edge of the pump, and maintains a constant carrier concentration as the pump traverses the waveguide. Since the majority of saturable absorbers have a strong refractive index vs. wavelength curve at the band edge, light can be slowed by many times more than the typical factor of 3~4, enabling even longer records for the amount of chip space used. Many materials are compatible with long pulse lasers to maintain sub-ps resolution, since many commercially available Q-switch lasers maintain a peak power strong enough to saturate a spatially resolvable amount of material within 1 ps. The pump and probe may be the same wavelength when a saturable absorber is used, which leverages very strong changes in refractive index as the band shifts past the probe wavelength. Either a 1D or a 2D waveguide can be fabricated and utilized, where a 2D waveguide helps contain the pump beam in cases where a pump induced refractive index change would otherwise cause significant divergence of the pump beam coupled in a 1D waveguide.

There are several strategies for probing the signal light with the pump light coupled. One strategy, shown in FIG. 3F, is for the probe 30 to be launched along the Y axis of the waveguide 86, and the pump 82 to be launched with lens 80 along the X axis of the waveguide to produce pump stripe 84. As the beams cross within the waveguide, phase is induced on the passing probe, and extract identical information to the instrument of FIG. 3A. The probe or pump may be launched at different angles to trade resolution for record. A grating, prism, or etalon on the probe or pump may be used to further enhance the record.

Figure 5:
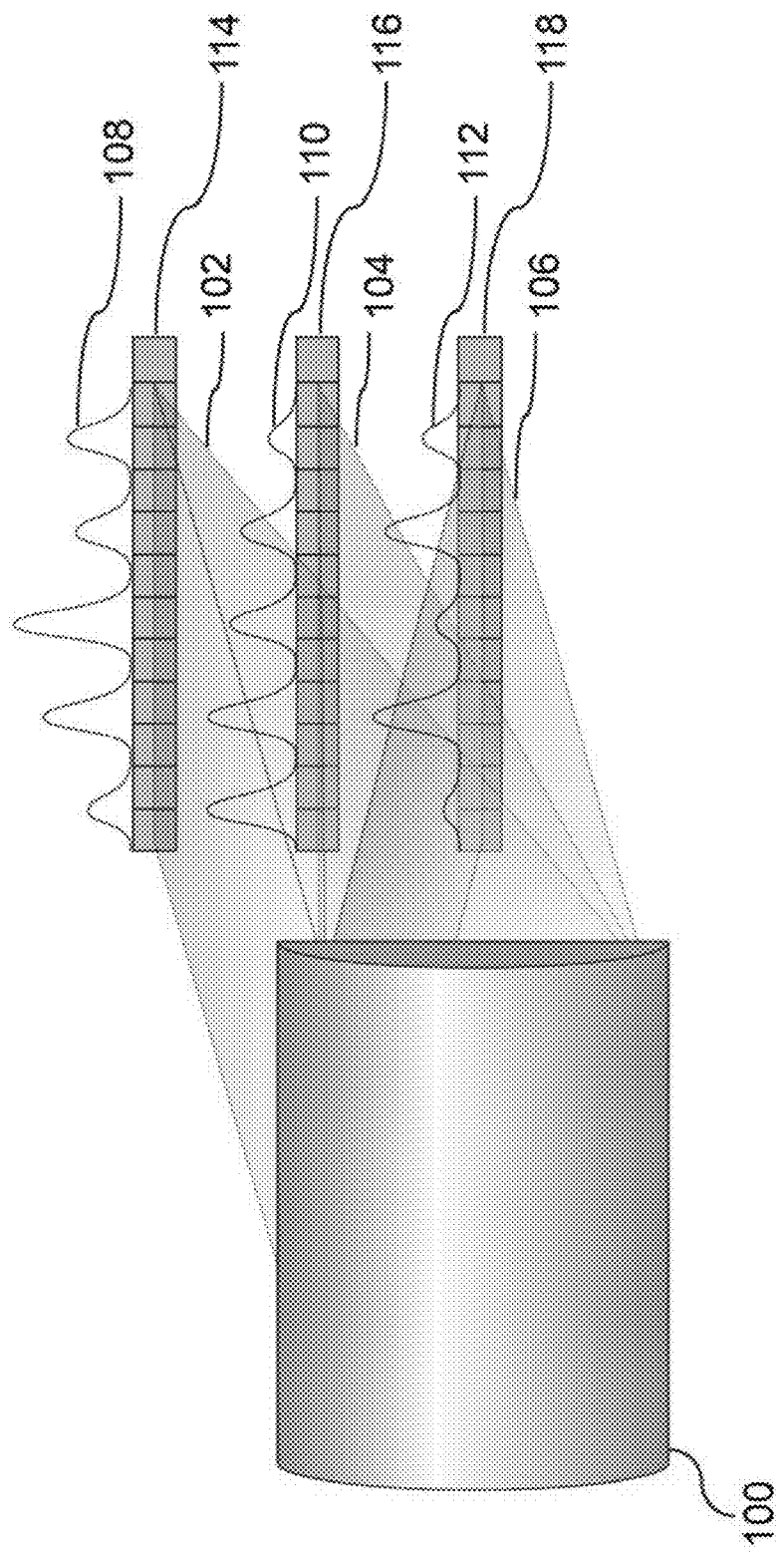
FIG. 5 demonstrates how multiple angularly multiplexed inputs or sub records can be demultiplexed to multiple rows on the camera.

As an alternative strategy, the signal 30 can traverse the waveguide 96 normal to its surface with the pump 92 launched with lens 90 into the waveguide to produce pump stripe 94, as shown in FIG. 3G. The probe or pump may be angled to enhance record. A grating, prism, or etalon may be used on the probe and/or pump to further enhance the record. The geometry readily lends itself to virtually extending the chip, since the edges of the slab may be mirrored or totally internally reflected to trap the pump light for multiple passes. For multiple signal inputs that are angularly multiplexed, FIG. 5 shows an arrangement whereby cylindrical lens 100 focuses angularly multiplexed beams 102, 104, and 106, carrying different signals 108, 110, 112 to be demultiplexed and recorded at the camera focal plane array on rows 114, 116, and 118 respectively.

Other Phase Change Mechanisms

The mechanisms for induced change in excited materials include (but are not limited to) the Drude plasma effect, the Bandfilling (Moss-Burstein) effect, the bandgap shrinkage effect, and the Kerr effect. Bandfilling and bandgap shrinkage effects can be particularly advantageous because they induce strong index changes. All of these effects can change both the real (refractive index) and imaginary (absorption) optical components of materials. Strong induced absorption, saturable absorber, or reverse saturable absorber effects can also be exploited either as an alternative to, or in addition to, phase effects to achieve the SLICER gating mechanism.

Another mechanism that may enhance the induced phase is the optical deflection created by the gradient of index in the semiconductor. The deflected rays travel a longer distance through the birefringent filter, which may also contribute to the total induced phase difference between the pumped and unpumped beam.

Additional SLICER Application Ideas/Extensions

In the design presented in FIG. 3A, SLICER is a one dimensional temporal recorder that exclusively uses the X axis of the wafer to encode information. However, the Y dimension of the wafer is available for use for encoding additional information; many novel devices can be created by reconfiguring what information is encoded in the X and Y axes. The following is a non-exhaustive list of several possible novel single-shot optical recorders, roughly grouped into similar modes of operation.

Multiple Records:

Multichannel SLICER for Extended Records (X Axis=Time, Y Axis=Multiple Records):

As an alternative to using extremely large optics to format a single stripe onto a similarly sized wafer, multiple stripes can be used to extend the record. Using a series of beamsplitters, such as a hyper Michelson pulse replicator, multiple delayed and Y shifted pump stripes can be sequentially created before lens 35 to focus to an array of stripes across the Y axis on wafer 36. Each resulting stripe on the camera encodes a successive sub-record of time, which can be post-combined to make a long record. Gratings, prisms, or etalons can be used on the pump to further enhance the record span.

Alternatively, a series of delayed and Y angularly multiplexed subrecord signal stripes can be created before polarizer 32. The multiplexed subrecords can then be pumped with a single pump stripe in FIGS. 3A-3G. Waveguide embodiments shown in FIGS. 3E and 3F would use stacked waveguides, with one waveguide per multiplexed subrecord. FIG. 5 shows an arrangement whereby cylindrical lens 100 focuses angularly multiplexed beams 102, 104, and 106, carrying different signals 108, 110, 112 to be demultiplexed and recorded at the camera focal plane array on rows 114, 116, and 118 respectively. This creates a series of stripes on the camera that encodes a successive portion of time, and combine to make a long record. Gratings, prisms, or etalons can be used on the pump and/or signal inputs to further enhance the record span.

Alternatively, in FIG. 3A, mirrors can be placed at the edges of a wafer 36 cleaved to a squared shape to virtually expand its size; the slanted pump 38 zig-zags diagonally across the X and Y axes of the squared wafer.

Multichannel SLICER for Recording of Multiple Inputs (X Axis=Time, Y Axis=Multiple Inputs)

A single record of multiple independent signal beams 30 could be simultaneously recorded. Multiple angled pump stripes can be sequentially created before lens 35 in FIG. 3A to focus to an array of stripes across the Y axis on wafer 36. If each pump stripe pumps a different optical probe, each resulting stripe on the camera encodes a successive signal input.

Alternatively, independent signal inputs can be angularly multiplexed and pumped with a single pump stripe in FIGS. 3A-3G. Waveguide embodiments shown in FIGS. 3E and 3F would use stacked waveguides, with one waveguide per multiplexed channel. FIG. 5 shows an arrangement whereby cylindrical lens 100 focuses angularly multiplexed beams 102, 104, and 106, carrying different signals 108, 110, 112 to be demultiplexed and recorded at the camera focal plane array on rows 114, 116, and 118 respectively. This creates a series of stripes on the camera that encodes successive signal inputs. Gratings or etalons can be used on the pump or signal inputs to further enhance the record span.

Alternatively, if the signals are finite in length, they can be delayed in time and recorded sequentially on the same channel.

Recording Phase Information;

All Optical Short Time Fourier Transform or Spectrogram (X Axis=Time, Y-Axis=Spectrum)

Replacing imaging element 48 of FIGS. 3A-3G with a free space spectrometer will expand the spectral information into the Y axis of the camera, and result in an all-optical short time Fourier transform. This may be useful as a direct recording of wavelength or frequency content of the signal vs. time (spectrogram). From the spectrogram, the phase information can be discerned in addition to the amplitude information 31, for example using a ptychographic phase retrieval algorithm.

Temporal Phase Measurement (X Axis=Time)

Compared to the short time Fourier transform approach, a way to more efficiently encode the same information is to interfere (heterodyne) the signal 30 with a known quasi-CW reference beam or local oscillator that travels co-parallel with, and is gated along with, the signal beam. Such a beam could be injected before polarizer 32 using a beamsplitter. The relative phase of the probe beam can be determined from the resulting measured interference pattern, provided that 1) the temporal resolution of the beam is oversampled by a factor of at least 2 compared to its finest feature, and 2) the spatial interference pattern on the camera is no shorter than 2 pixels at any point in the record. The total phase information content can be doubled for improved phase retrieval robustness by creating two SLICER measurements analogously to a two-channel lock-in amplifier, where the quasi-CW reference beam or local oscillator is phase shifted by 90 degrees in one of the measurements. This can be readily achieved in a 'multiple records' fashion across two adjacent rows of pixels with a vertically tilted reference beam.

Since this method does not require a new axis to record information, it is simultaneously compatible with any of the 'multiple records' and 'spatial information' techniques. When combined with spatial information techniques, phase delays across the spatial axis of the beam or image (i.e. spatial chirp) would be encoded by the technique.

An additional advantage of mixing the beam with a quasi-CW beam or local oscillator is that low intensity signals are amplified by mixing with the quasi-CW reference beam or local oscillator. Therefore, the total signal/noise of the measurement may be improved analogously to the operation of a coherent communications/detection system. A local oscillator with sufficient intensity to fill ½ the camera dynamic range per pixel maximizes the depth of modulation.

Ultrafast Ellipsometer (X Axis=Time, Y Axis=Polarization on 2 Rows)

The absolute polarization of the probe beam across time can be determined by creating two simultaneous SLICER measurements, each measuring an orthogonal polarization component of the input signal beam 30 at the input of the SLICER device. This can be performed with either two independent SLICER instruments in FIGS. 3A-3G, or with a 'multiple records' approach by placing a polarizing beamsplitter, polarization-sensitive interferometer, beam displacing prism or polarizing lateral displacement beamsplitter before polarizer 32.

Recording Spatial Information:

2D Ultrafast Camera: (X Axis=Space, Y Axis=Space, Tiled Images on Camera Spanning Time)

The free space SLICER technique can preserve the signal's spatial information, which inherently provides several possible topologies as a high-speed shutter for 2D photography. Configuring the pump in FIG. 3A to be collinear with the signal 30 using a beamsplitting polarizer as element 32 or a dichroic mirror and pumping the entire wafer 36 with a single pump pulse would capture a full photographic frame of information.

Alternatively, a 'multiple records' approach could be taken. A series of delayed and X & Y raster pattern angularly multiplexed signal beams 30 can be created before polarizer 32 in FIG. 3A. The signal beams and the collinear pump are then focused to a single point onto wafer 36 by placing a lens before wafer 36. If the pump is not in a collinear arrangement with the signal, Lens 35 can be replaced with a spherical lens. Removing lens 44 demultiplexes the images onto the imaging device that each encode the spatial information at a point in time, and combine to make a movie.

1D Imaging (X Axis=Time, Y Axis=Space):

Some applications require only one resolvable spatial dimension (e.g., imaging through a slit). Spatial information can be captured on the Y axis orthogonal to the plane of FIGS. 3A-3G, while maintaining the X axis as a time axis with pump and signal in a non-collinear arrangement. Imaging the object Y axis onto the wafer 36 Y axis and pumping the full wafer by eliminating cylindrical lens 35 would capture a full spatiotemporal frame of information.

Alternatively, the Y axis of the signal 30 could be focused onto the wafer 36 with a cylinder lens before the wafer, and the pump 38 could be focused to an overlapping stripe with cylinder lens 35. This could be combined with a 'multiple records' approach to create several spatiotemporal records. The gratings, prisms, or etalons could be used on the pump and/or X axis of the signal to enhance the record span.

Ultrafast Shack Hartman Wavefront Sensor (Tiled Images on Camera Encoding Wavefront)

Replacing imaging device 48 in FIGS. 3A-3G with a Shack-Hartmann camera resolves the wavefront when combined with a 1D or 2D imaging technique. This could be combined with any of the 'multiple records,' 'phase information,' or 'spatial information' techniques to record ultrafast wavefront information, provided that the measurement accommodates the Shack-Hartmann lenslet array pixel grouping.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method, comprising:
    making a collinear delayed copy of a transient electromagnetic radiation signal, wherein said transient electromagnetic radiation signal and said delayed copy occupy a common cross-sectional area;
    scanning an optical pump across a nonlinear element within said cross-sectional area to produce from said transient electromagnetic radiation signal and said delayed copy a phase changed signal and a phase changed copy, respectively;
    overlapping in time said phase-changed signal and said phase changed copy to produce a final signal and a final copy, respectively; and
    destructively interfering said final signal with said final copy except during the brief time window where the pump has altered the phase of said final copy before that of said final signal, wherein during said brief time window as said pump arrives at said nonlinear element, said final signal and said final copy form a spatial replica of the time content of said transient electromagnetic radiation signal.

2. The method of claim 1, wherein said transient electromagnetic radiation signal is linearly polarized along a first direction and wherein said delayed copy is linearly polarized along a second direction that is orthogonal to said first direction.

3. The method of claim 2, wherein said transient electromagnetic radiation signal is linearly polarized by a linear polarizer.

4. The method of claim 1, wherein said transient electromagnetic radiation signal is linearly polarized along a first direction and is passed through a first optical element to produce said delayed copy, wherein said delayed copy is linearly polarized along a second direction that is orthogonal to said first direction.

5. The method of claim 4, wherein said first optical element is selected from the group consisting of a birefringent element, retarder and a waveplate.

6. The method of claim 1, wherein said nonlinear element is selected from the group consisting of a bulk medium and a waveguide.

7. The method of claim 1, where said nonlinear element is a semiconductor with an integrating nonlinear response resulting from optically-pumped charge carriers altering the refractive index of said transient electromagnetic radiation signal and said delayed copy.

8. The method of claim 1, where said nonlinear element is a semiconductor with an integrating nonlinear response resulting from optically-pumped charge carriers altering the refractive index of said transient electromagnetic radiation signal and said delayed copy through a process selected from the group consisting of plasma refraction, bandfilling and bandgap shrinkage.

9. The method of claim 1, wherein the step of scanning an optical pump across a nonlinear element comprises slanting the incidence angle of a short pulse arriving at the surface of said nonlinear element.

10. The method of claim 1, wherein the step of scanning an optical pump across a nonlinear element comprises tilting the pulse front of a short pulse arriving at the surface of said nonlinear element.

11. The method of claim 10, wherein the step of tilting the pulse front is carried out with an angularly dispersive optical element.

12. The method of claim 11, wherein said angularly dispersive optical element is selected from the group consisting of a diffraction grating and a prism.

13. The method of claim 10, wherein the step of tilting the pulse front is carried out with a wedge or an etalon.

14. The method of claim 1, wherein the step of scanning an optical pump across a nonlinear element comprises providing multiple discrete copies of a short pump pulse at different spatial offsets and delays such that they arrive with a discrete scan at the surface of said nonlinear element.

15. The method of claim 1, wherein the step of overlapping in time said phase-changed signal and said phase changed copy comprises propagating said phase-changed signal and said phase changed copy through a second optical element selected from the group consisting of a birefringent element, a retarder and a or waveplate.

16. The method of claim 1, further comprising recording said spatial replica.

17. The method of claim 16, wherein said spatial replica is recorded with a recording element selected from the group consisting of a camera, a digitizer array, a spectrometer and a wavefront sensor.

18. The method of claim 17, wherein said wavefront sensor comprises a Shack-Hartmann wavefront sensor.

19. The method of claim 1, wherein said transient electromagnetic radiation signal comprises one or more of multiple sub-records, multiple points on an object, and multiple sources, and are multiplexed angularly or spatially on said nonlinear element.

20. An apparatus, comprising:
   means for making a collinear delayed copy of a transient electromagnetic radiation signal, wherein said transient electromagnetic radiation signal and said delayed copy occupy a common cross-sectional area;
   means for scanning an optical pump across a nonlinear element within said cross-sectional area to produce from said transient electromagnetic radiation signal and said delayed copy a phase changed signal and a phase changed copy, respectively;
   means for overlapping in time said phase-changed signal and said phase changed copy to produce a final signal and a final copy, respectively; and
   means for destructively interfering said final signal with said final copy except during the brief time window where the pump has altered the phase of said final copy before that of said final signal, wherein during said brief time window as said pump arrives at said nonlinear element, said final signal and said final copy form a spatial replica of the time content of said transient electromagnetic radiation signal.

21. The apparatus of claim 20, a linear polarizer positioned to linearly polarize said transient electromagnetic radiation signal along a first direction.

22. The apparatus of claim 20, a first optical element positioned to produce said delayed copy, wherein said delayed copy is linearly polarized along a second direction that is orthogonal to the polarization direction of said transient electromagnetic radiation signal.

23. The apparatus of claim 22, wherein said first optical element is selected from the group consisting of a birefringent element, retarder and a waveplate.

24. The apparatus of claim 20, wherein said nonlinear element is selected from the group consisting of a bulk medium and a waveguide.

25. The apparatus of claim 20, wherein said nonlinear element is a semiconductor with an integrating nonlinear response resulting from optically-pumped charge carriers altering the refractive index of said transient electromagnetic radiation signal and said delayed copy.

26. The apparatus of claim 20, wherein said nonlinear element is a semiconductor with an integrating nonlinear response resulting from optically-pumped charge carriers altering the refractive index of said transient electromagnetic radiation signal and said delayed copy through a process selected from the group consisting of plasma refraction, bandfilling and bandgap shrinkage.

27. The apparatus of claim 20, wherein said means for scanning includes means for slanting the incidence angle of a short pulse arriving at the surface of said nonlinear element.

28. The apparatus of claim 20, wherein said means for scanning includes means for tilting the pulse front of a short pulse arriving at the surface of said nonlinear element.

29. The apparatus of claim 28, wherein said means for tilting is carried out with an angularly dispersive optical element.

30. The apparatus of claim 29, wherein said angularly dispersive optical element is selected from the group consisting of a diffraction grating and a prism.

31. The apparatus of claim 29, wherein said means for tilting is carried out with a wedge or an etalon.

32. The apparatus of claim 20, wherein said means for scanning is configured to provide multiple discrete copies of a short pump pulse at different spatial offsets and delays such that they arrive with a discrete scan at the surface of said nonlinear element.

33. The apparatus of claim 20, wherein said means for overlapping comprises a second optical element selected from the group consisting of a birefringent element, a retarder and a or waveplate, wherein said phase-changed signal and said phase changed copy are propagated through said second optical element selected from the group consisting of a birefringent element, a retarder and a or waveplate.

34. The apparatus of claim 20, further comprising means for recording said spatial replica.

35. The apparatus of claim 34, wherein said means for recording is selected from the group consisting of a camera, a digitizer array, a spectrometer and a wavefront sensor.

36. The apparatus of claim 35, wherein said wavefront sensor comprises a Shack-Hartmann wavefront sensor.

37. The apparatus of claim 20, further comprising means for multiplexing angularly or spatially said transient electromagnetic radiation signal on said nonlinear element wherein said transient electromagnetic radiation signal comprises one or more of multiple sub-records, multiple points on an object, and multiple sources.

* * * * *